US008019004B2

(12) United States Patent
Elberbaum (10) Patent No.: US 8,019,004 B2
(45) Date of Patent: Sep. 13, 2011

(54) METHOD AND APPARATUS FOR CONVERTING CODED SERIAL VIDEO SIGNAL INTO SERIAL IP VIDEO SIGNAL

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 1299 days.

(21) Appl. No.: 11/645,128

(22) Filed: Dec. 22, 2006

(65) Prior Publication Data

US 2008/0151884 A1 Jun. 26, 2008

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................................. 375/240.26
(58) Field of Classification Search ........................ None
See application file for complete search history.

(56) References Cited

U.S. PATENT DOCUMENTS

| 7,080,544 | B2 * | 7/2006 | Stepanik et al. ............. 73/31.02 |
| 2005/0174445 | A1 * | 8/2005 | Yamashina ................. 348/231.7 |
| 2005/0200486 | A1 * | 9/2005 | Greer ......................... 340/573.1 |
| 2010/0095336 | A1 * | 4/2010 | Hirano et al. ................. 725/109 |

* cited by examiner

*Primary Examiner* — Nhon Diep
(74) *Attorney, Agent, or Firm* — Katten Muchin Rosenman LLP (57) ABSTRACT

A method and system for converting coded serial video signal into a serial IP video signal, including steps of receiving the coded serial video signal and detecting the serial video timing, converting the serial video signal to a serial sequence of packets each consisting of a converted individual digital video signal, and extracting and decoding the identification code of each individual video signal of the coded serial video signal. The method and system also perform steps of applying a conversion program for assigning IP addresses including at least a source address and a destination address for each decoded identification code, generating IP packets by adding to each of the packets its assigned IP addresses, and feeding the IP packets to a network one after another in the serial sequence.

59 Claims, 7 Drawing Sheets

METHOD AND APPARATUS FOR CONVERTING CODED SERIAL VIDEO SIGNAL INTO SERIAL IP VIDEO SIGNAL

BACKGROUND OF THE INVENTION

1. Field of the Invention

This invention relates to a method and apparatus for processing and propagating television camera signals for recording IP video signal over a network in a close circuit television system.

2. Description of the Prior Art

In a monitoring television system used, as one of information transmission system, at least one video cassette recorder or a digital video recorder is connected through an electronic switch to a plurality of television cameras and transmission lines. The electronic switch known as multiplexer or frame switcher provides for fast rate sequential switching for recording onto the video recorder a picture image of one camera after another.

In such an information transmission system, it is preferable to mutually lock the internal synchronizing signals of a plurality of television cameras and the electronic switching time to an external synchronizing signal, in order to prevent the recording from being disturbed during and immediately after the switching operation from one television camera to another. Such external synchronizing also provides for switching at a rate of 30 frames or 60 fields per second of, for example, the NTSC television system, and which is known as the real time rate.

A known apparatus for synchronizing a plurality of television cameras is an apparatus for transmitting an external synchronizing signals from an external synchronizing generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352 the contents of which are incorporated herein by reference.

Another known apparatus for synchronizing the plurality of the television camera signals is an apparatus for memorizing each of the television camera signal in a memory circuit and feeding the signals to the video recorder, synchronously via the electronic switch from the memory circuits. Such an apparatus is disclosed in U.S. Pat. No. 5,267,039 the content of which are incorporated herein by reference.

Furthermore, the known apparatuses for recording plurality of camera signals at fast sequencing rate require that each individual camera signal will incorporate a coded identification signals, providing for simple retrieval of the signal through a coded selection. In the case of using analogue video cassette recorder, the coded identification is known to be recorded during the vertical blanking period of the television signals, but in the case of using a digital video recorder it is known that digital video recorders ignore the vertical blanking period and instead they employ a complex control software for indexing the files of the recorded digital signals of each individual camera.

Because the software programs for controlling the individual files of the digitally recorded camera signals are complex, it renders the processing, transferring and/or retrieval of the recorded digital signals to and from disks, tapes or other medium time consuming. Moreover, because of the limited capacity of the digital recorder's storage medium the digital video recorders record in a continuous FIFO (First In First Out) rotation, and it is necessary to introduce a protection software programs for the recorded alarms or event files in order to retain such recording for extended periods by excluding such alarms and events files from the FIFO process. The continued randomly changing, deletion and/or addition of protected files cause an inefficient FIFO recording in rotation, particularly when large numbers of television cameras are used. Moreover, the complexity of the software programs makes it impractical to combine plurality of digital recorders for increasing the overall storage capacity as needed or at will.

Large capacity digital recording systems such as network recorders with RAID storage (Redundant Array of Independent Disks), having large number of HDDs (Hard Disk Drive) that can be increased at will do provide for very large storage capacity needed in security system. However such network recorders must be fed with digital video signals in packets that include IP (Internet Protocol) addresses, as used in Ethernet network or the Internet, with each individual video signal source generating its own assigned or allotted IP or MAC address (Media Access Control address) as the source address. This restricts the use to only IP cameras or to analog cameras that are connected to IP video encoders or servers. Such multiple independent IP cameras and/or IP video servers cannot be individually programmed to sequence in concert with the other cameras or to timely generate their signals to the network recorder in a repeated accurate sequence. To create such organized, orderly IP serial video signal mandates a complex software program for enabling the network recorder to feed in sequence rotation a command to each IP camera or IP video server for initiating the transmission of each individual camera signal. Such recording network occupied with sequence commands from the recorder to the cameras limits the transmission rate from the cameras to the recorder and calls for very complex management software program which is expensive and difficult to handle.

SUMMARY OF THE INVENTION

It is the object of the present invention to provide a method and an apparatus for converting the sequentially switched coded serial video signal comprising individually coded composite video signals into serial IP video signal comprising packets of digital video signals combined with individual addresses such as IP address or MAC address as used in network communications, such as Bus-line, LAN, WAN or the Internet.

In the following description the term "coded video signal" refers to a coded video signal commonly used in well known multiplexers or in frame switchers as described in U.S. Pat. Nos. 4,943,684, 5,267,039, 5,335,014 and 5,579,060 the contents of which are incorporated herein by reference and to the well known ID CODE®.

The term "coded serial video signal" refers to an output signal as generated by a well known multiplexers and frame switchers, comprising a sequence of coded video signals outputted one after another in a routine pattern.

The term "frame switcher" refers to a switch that is synchronously operated, timed by an external or internal sync generator as described in above U.S. Pat. Nos. 5,267,039, 5,335,014, 5,579,060 and in the pending U.S. patent application Ser. No. 09/818,243 for generating ID coded serial video signal.

The term "IP video signal" refers to a digital video signal, compressed or non compressed, combined with IP addresses or similar addresses as used for propagating packets of signals through a network, such as Bus-line, LAN, WAN, ATM, Internet and other commonly used communication networks.

The term IP video signal as referred to a compressed video signal can be compressed by any known compression, such as JPEG, MJPEG, MPEG, MPEG1, MPEG2, MPEG4, H263, H624, WAVELET and any other ISO compression and/or custom designed and/or programmed compression.

The term "serial IP video converter" as referred to is the apparatus for converting coded serial video signal into serial IP video signal.

A method for converting coded serial video signal generated by a plurality of video transmitters and fed by a multiplexer or a frame switcher to a serial IP video converter, with each individual video signal includes an identification code signal assigned to each of said transmitters into serial IP video signal, according to the present invention said method comprises the steps of;

receiving said coded serial video signal and decoding the identification code of said individual video signal;

assigning an IP addresses including at least a source and a destination address for the decoded codes;

converting said serial video signal to a serial sequence of packets each consists of a converted individual digital video signal;

forming an IP packet by adding to each of said packets its assigned IP addresses; and feeding said IP packets to a network one after another in said serial sequence.

The method further comprises the steps of:

receiving other coded data related to said transmitters from one or more of said individual video signal including data selected from a group comprising time and date of a triggered alarm signal, said alarm data, a motion detection data, a camera diagnostic data, said camera positions data, said camera malfunction data, said camera site data and combinations thereof; and decoding said other coded data for adding a decoded other data into said IP packet of said individual video signal.

An apparatus for converting coded serial video signals generated by a plurality of video transmitters, each incorporating individually allotted identification code signal, fed by one of multiplexer and frame switcher, into a sequencing IP video signals includes a receiving circuit for receiving said coded serial video signal comprising an extractor-decoder circuit for extracting and decoding the identification code of each individual video signal, an analog to digital converter circuit for converting said each individual video signal into a packet of digital video signal, a sync separator circuit for detecting the sequence timing, and a CPU (Central Processing Unit) for assigning IP source and destination addresses to each of the decoded identification codes, for combining each said packet with its assigned IP source and destination addresses into IP packet and for generating a serial sequence of individual IP packets and for outputting said IP packets in a timely routine into a network.

The serial IP video converter according to the present invention comprises a receiver for receiving coded serial video signal fed by one of multiplexer and frame switcher and generated by a plurality of transmitters, each of the coded video signals is combined with an identification code signal exclusively or uniquely allotted to each transmitter, or to each input of said multiplexer and said frame switcher; a digital to analog converter for converting the received serial video signals into digital signals; a code extractor/decoder for decoding and outputting the codes of the received coded serial video signals; a CPU for processing said digital signals and said codes for generating and feeding IP packets into a network buffer; an external sync input or a synchronizing separator for outputting the sync of the received serial video signal for timing the processing by said CPU; a controller for controlling said CPU processing of said codes and said IP addresses into a conversion lookup table, and for generating timing signals and commands for operating said CPU; a memory for storing said conversion lookup table and other data pertaining said transmitters, data pertaining said CPU operation, said codes and said IP addresses;

Each of said transmitters includes a well known television cameras allotted with an exclusive or unique identification code, known as ID CODE, each transmitter incorporates a circuit for generating code signals corresponding to the identification code, and a circuit for combing the code signals into the video signal as disclosed in U.S. Pat. No. 4,943,864. Alternatively, the allotted identification code signal, as disclosed in U.S. Pat. No. 5,267,039, can be generated by a code generator for injecting a code signal into the video signal along each individual transmission line, or by a well known coding, using code generator and code mixing circuits incorporated in the multiplexer or the frame switcher for injecting a code into the sequencing video signals, coordinated and in concert with the electronic switch.

A well known multiplexer or a frame switcher include an electronic switch for connecting the video signals fed from the television cameras in a predetermined time and rate sequence, for feeding the individual coded video signals one after another to the apparatus for converting the coded serial video signal into serial IP video signal. Therefore, it is preferable that the switching rate will commensurate with the frequency of the vertical period of the video signal, and that the predetermined time is at least one vertical period of the video signal.

When the composite video signals generated by the television cameras are non externally synchronized the multiplexer or the frame switcher may include a well known sync generator circuit and/or an analogue to digital converter and/or memory circuits for reorganizing the time base of the fed video signals, also known as time base correction, such, that the video signals processed within the multiplexer or the frame switcher and sequentially switched by the electronic switch are in tandem with the sync generator.

When said transmitters do not include code signal generator it is necessary to provide the multiplexer or the frame switcher with a circuit for injecting the identification code signal into each individually outputted video signal, it is also preferable to include coding process to the time and date of events and/or alarms signal, as well as other data signals such as camera diagnostic, camera positioning, motion detection data and combinations thereof into the vertical blanking portion of the video signals.

The well known multiplexer or the frame switcher commonly includes a CPU or DSP (Digital Signal Processor) for processing and controlling the code generator and the different operating circuits, the time and date, the timing and the functions of the switching process and for controlling the memory devices used for storing processed video signal and data.

The network recorder can be a commonly available server PC installed with a well known operating systems such as windows, Linux or other operating systems and is programmed for receiving the serial IP video signal from the network and storing the received sequencing signals, on the basis of their IP addresses, into an HDD array such as RAID for long term storage and retrieval. By assigning to one or more of the individual packets with different destination IP addresses it is possible to feed selectively any one or more individual IP packet, or serial IP packets, or any of the packets containing other data, to any one or more server PC and/or RAID or to any other digital storage or digital recorder that are connected to the network.

For retrieving the stored signal the software includes a playback program for displaying the recording through the server PC or through a remote PC connected via the network. The retrieving or the playing back enables the selection of any IP video signal at a selected time and date of the recording, or by selecting any of a logged item of the recorded data.

By this and by the detailed description of the preferred embodiment it will become clear that coded serial video signals generated by plurality of video transmitters and fed by a well known multiplexer or frame switcher, converted by the method and apparatus of the present invention into serial IP video signal greatly simplifies the feeding of large volume of video signals and for long storage time when using large capacity digital recorders.

BRIEF DESCRIPTION OF THE DRAWING

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
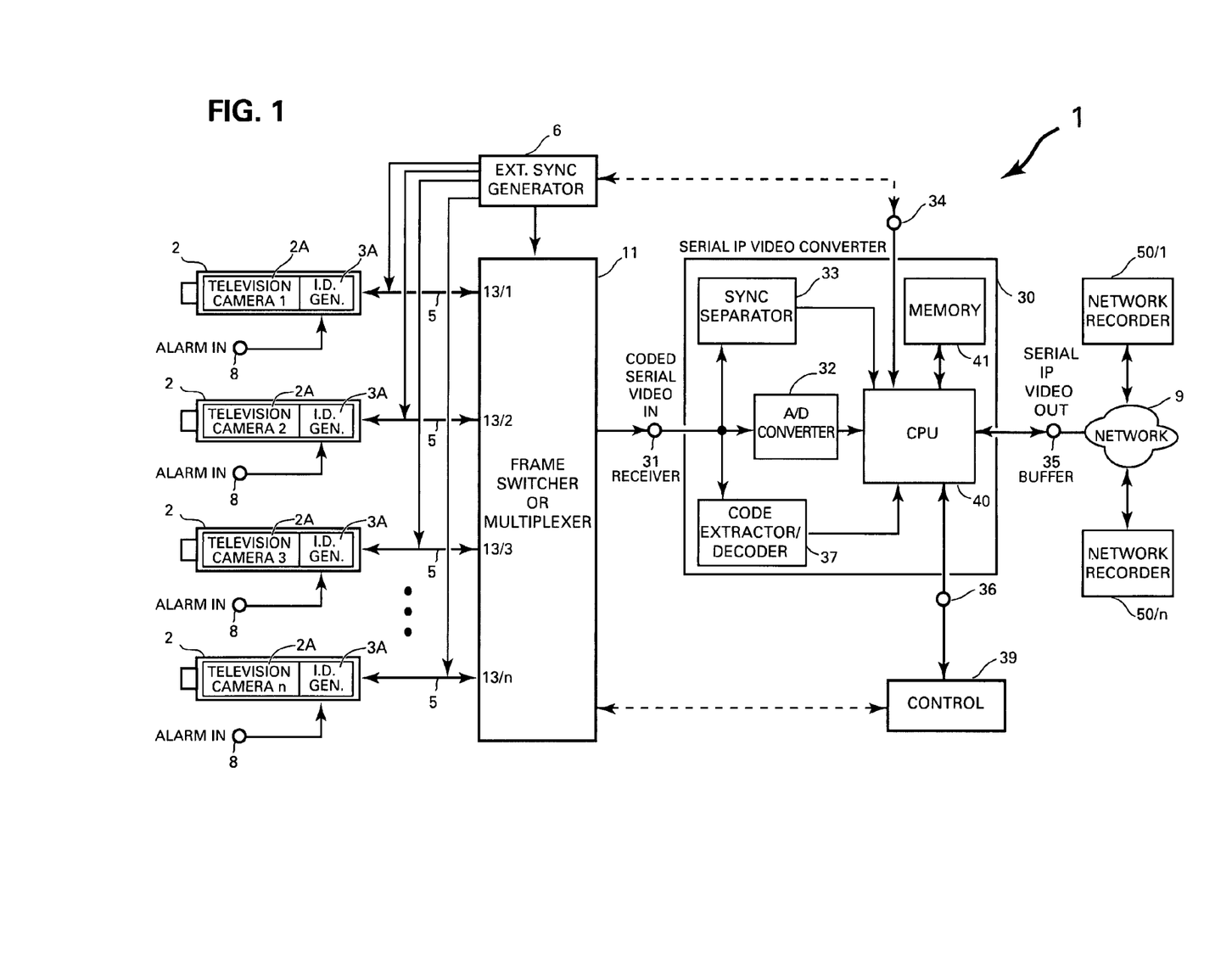
FIG. 1 is a block diagram showing an electric circuit of a system for converting coded serial video signal into serial IP video signal of a preferred embodiment according to the present invention.
Figure 2:
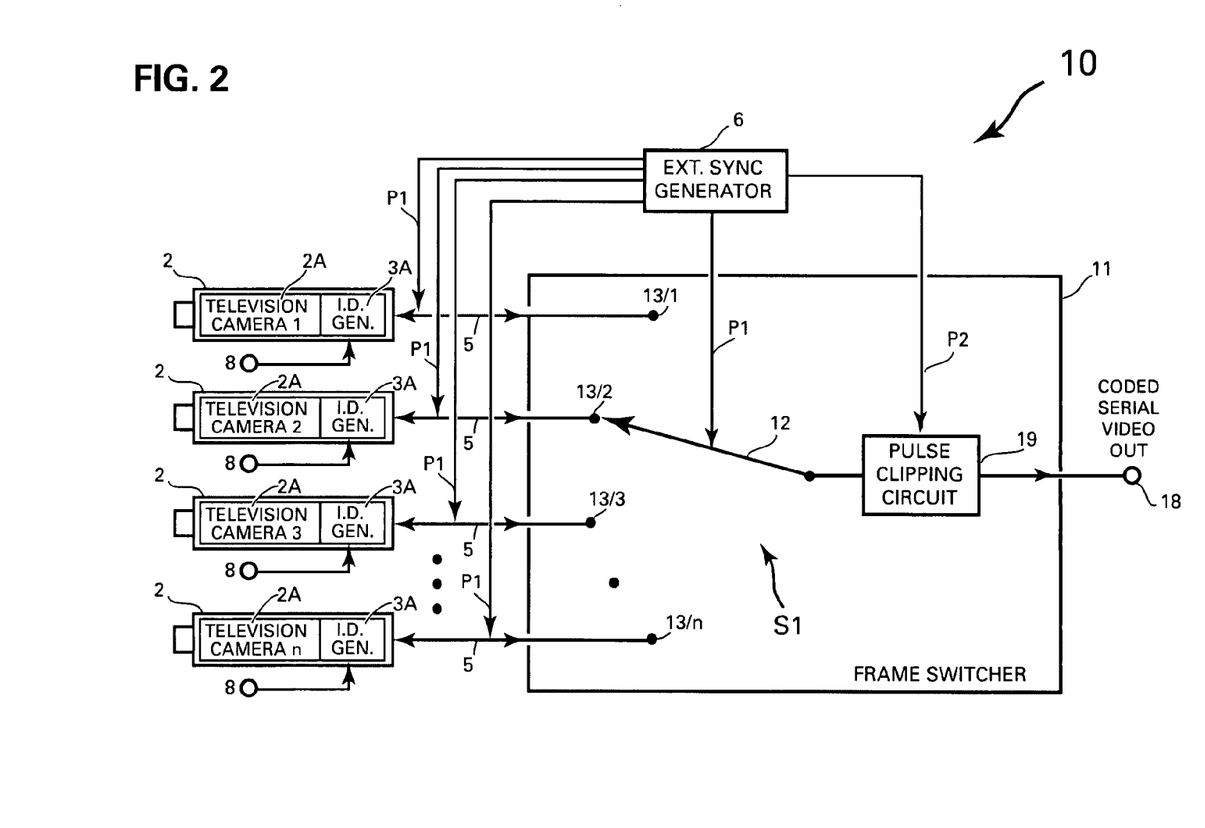
FIG. 2 is a block diagram showing an electric circuit of a well known frame switcher including well known externally synchronized television cameras incorporating a known identification code generating circuit.

Referring to FIG. 1, the system 1 for converting coded serial video signal into serial IP video signal includes a well known external synchronizing signal generator 6, a plurality of transmitters 2 incorporating television cameras 2A synchronized by the external synchronizing signal and generating a video signal corresponding to the images picked-up by the television cameras, a plurality of well known identification code generators 3A for mixing into each video signal generated by the transmitters 2 a code signal allotted to each transmitter and a well known frame switcher 11 for receiving and outputting the coded video signals in a serial sequence, the frame switcher 11 incorporates a switch S1 shown in FIG. 2 for connecting sequentially in rotation the transmitters 2 to the video out terminal 18 at a predetermined rate and time, a synchronizing pulses P1 fed from the ext.sync generator 6 are injected into each video transmission lines 5 for transmitting the external synchronizing signal to the television cameras 2A and a pulse P2 is fed to the clipping circuit 19 for clipping the external sync pulses from the output 18 of the frame switcher, that feeds the sequencing coded video signals to the serial IP video converter 30 through its input receiver 31 for converting the coded serial video signals into serial IP video signal.

The pulses P1 and P2 are well known pluses and the television camera 2A is a well known television camera synchronized by a synchronizing pulse having a level higher than the white level of a composite video signal, as described in U.S. Pat. Nos. 4,603,352 and 5,267,039, the contents of which are incorporated herein by reference.

The synchronizing pulse P1 is also inputted to the switch pole 12 for synchronizing the sequencing operation on the basis of the frame or field synchronizing pulses. Though the switch S1 in FIG. 2 is shown as a mechanical switch the switches used in the well known frame switchers and in multiplexers are electronic or digital switches.

The frequency of the external synchronizing signal commensurates with the frequency of the vertical scanning frequency of the video signal outputted from the transmitter 2. The frequency of the external synchronizing signal may be either of a frame scanning frequency or a field scanning frequency, for example, in case of NTSC system the vertical synchronizing signal frequency is 60 Hz, therefore, the field frequency is 60 Hz and the frame frequency is 30 Hz.

Figure 3:
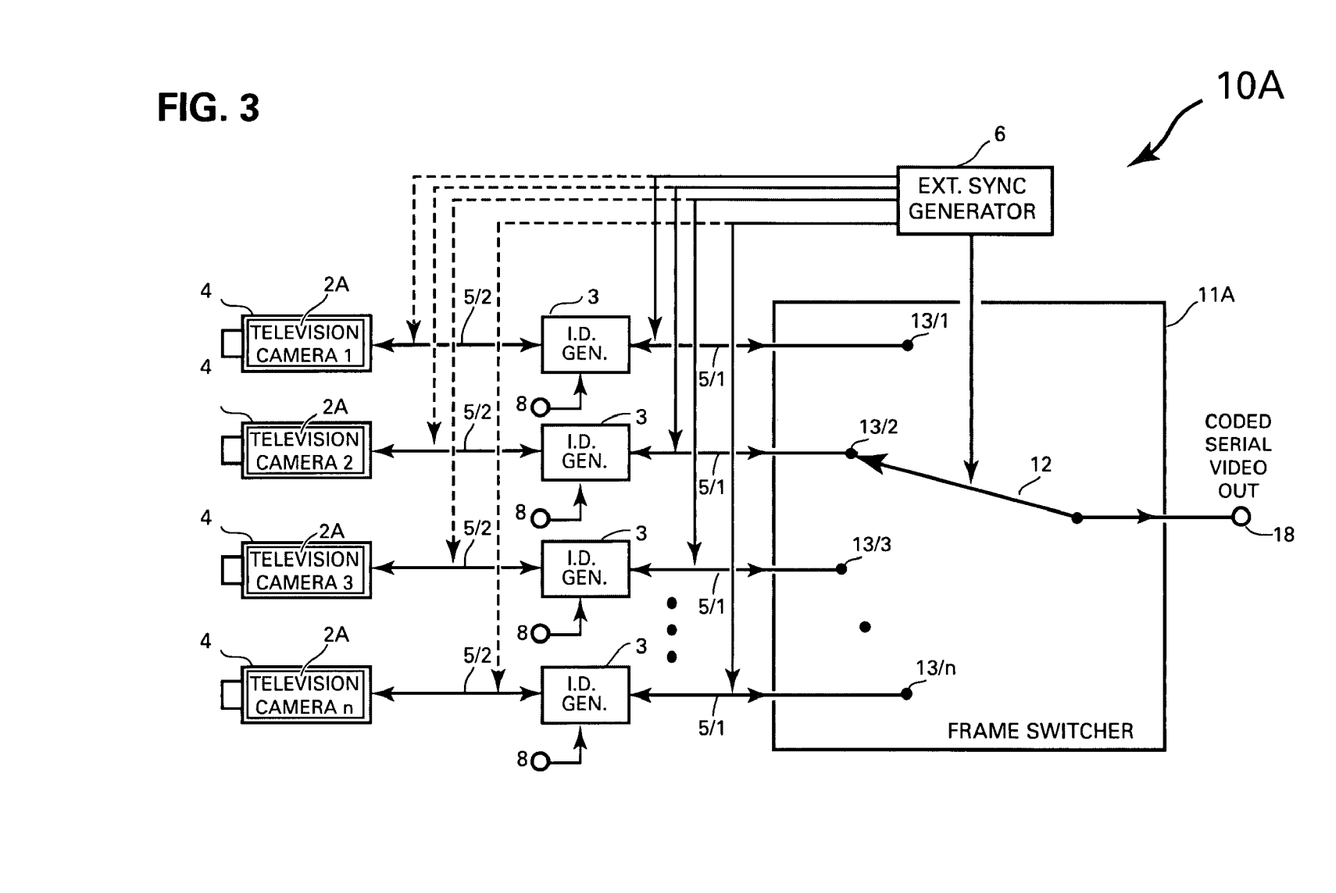
FIG. 3 is a block diagram showing another electric circuit of a frame switcher with an identification code generating circuits separated from the television cameras.

The synchronizing generator 6 of a well known frame switcher setup 10A shown in FIG. 3 and described in U.S. Pat. No. 5,267,039 injects the external synchronization pulses into the video transmission lines 5/1, connecting the identification code generators 3 with the inputs 13/1~13/n of the switch S1. The external sync pulses can be injected into the video transmission lines 5/2, regardless of the locations of where the identification code signals are injected into the video transmission lines. Further, instead of injecting the synchronizing pulse into the transmission lines the synchronizing pulse signal P1 may be outputted directly to the television camera 2A.

In case the television camera 2A is synchronized by the AC line frequency known as line lock, or by the known horizontal and vertical synchronizing signal, or by a composite synchronizing signal known as genlock, or the horizontal and vertical drive signals, or the vertical drive signal, a generation circuit for the horizontal and vertical synchronizing signals, or composite synchronizing signal, or the horizontal and vertical drive signals or the vertical drive signal may be disposed, instead of the synchronizing pulse generator 6. In this case, the synchronizing pulse injection and the synchronizing pulse clipping circuit 19 are not needed.

Figure 5:
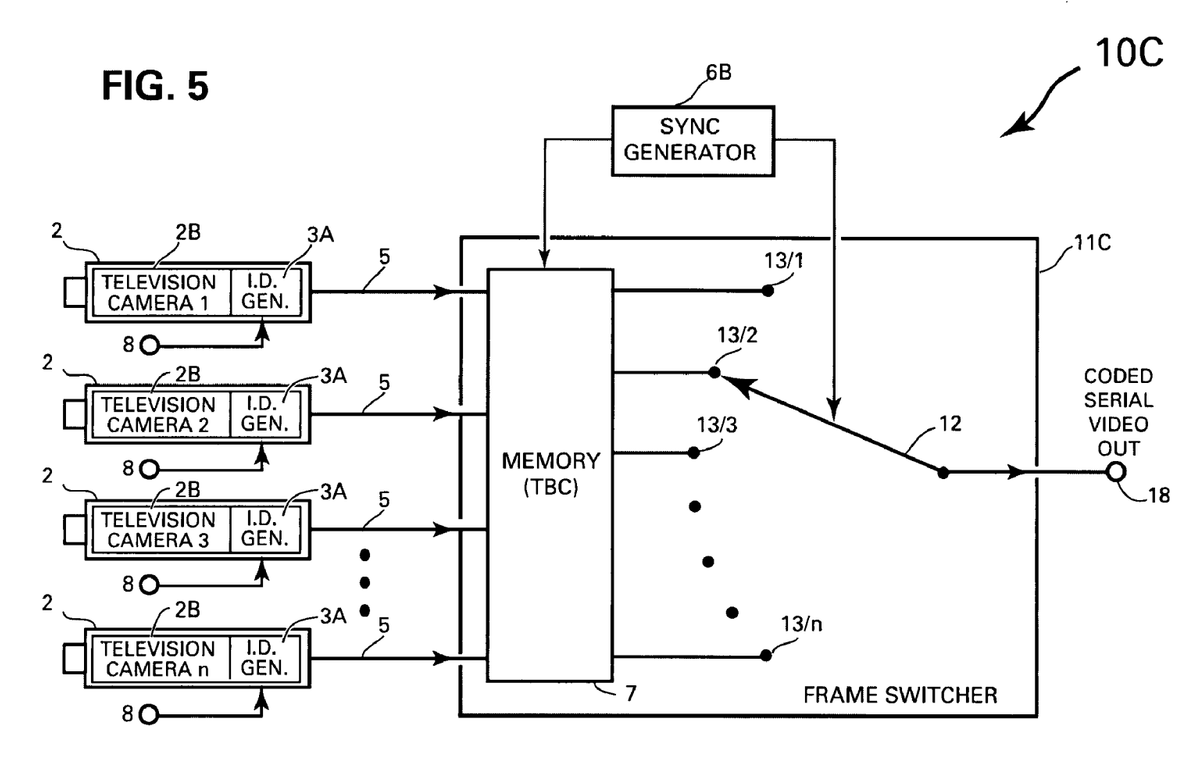
FIG. 5 is a block diagram showing electric circuit of another frame switcher incorporating time base corrector and cameras, each incorporating identification code generating circuit.
Figure 6:
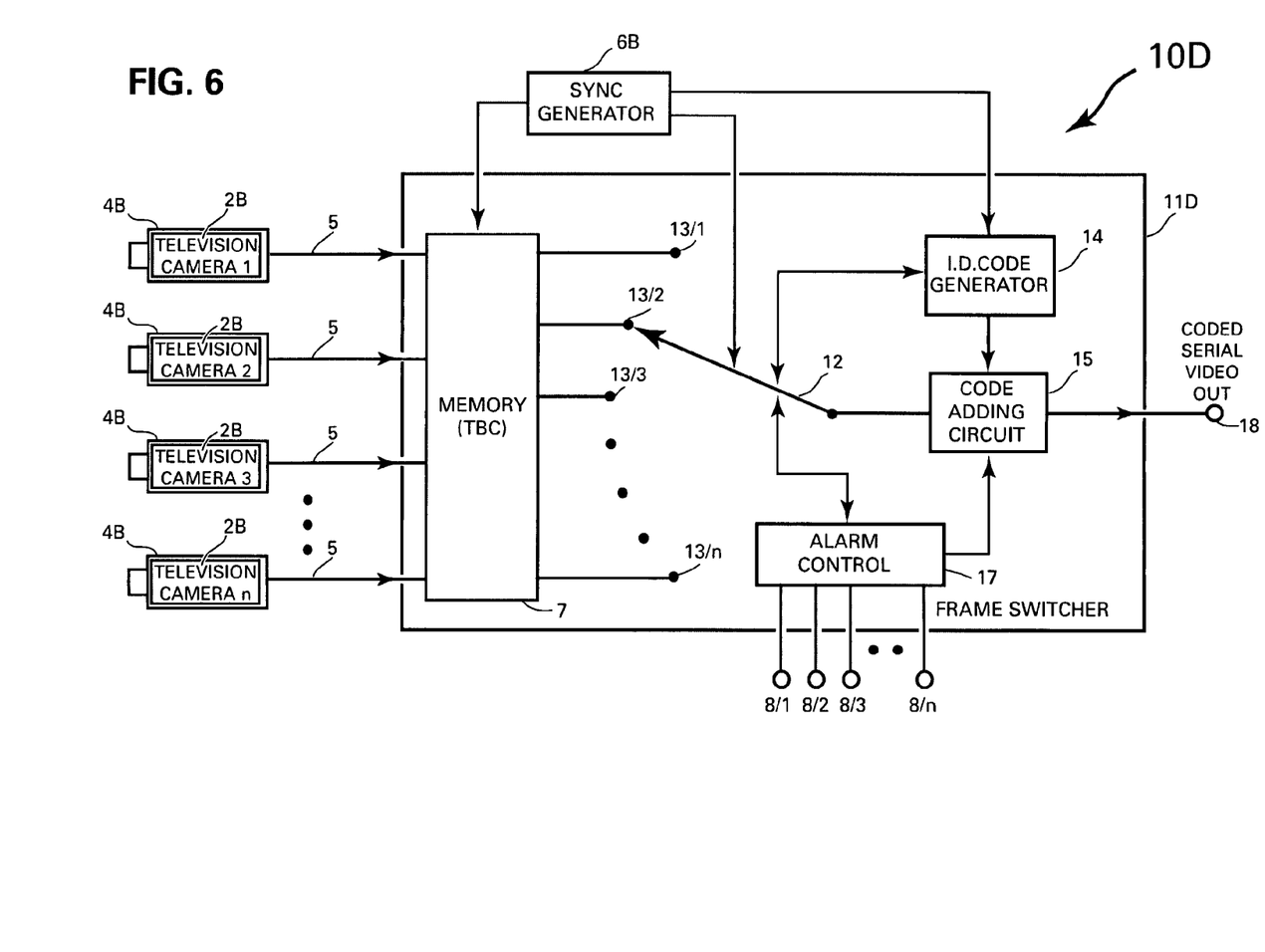
FIG. 6 is a block diagram showing yet another frame switcher incorporating time base corrector and with an identification code generating circuit.

Moreover, the well known frame switcher or multiplexer shown in FIG. 5 and FIG. 6 can connect non externally synchronized cameras 2B for generating coded serial video signal, by using for example, a well known time base corrector 7 that may include frame or field memory circuit disposed at the inputs 13/1~13/n of the switch circuit S1, whereby, the time base corrector and/or the frame or field memory circuit will store at least one vertical scanning period of the video signals generated by transmitters 2 or 4B and retrieve the stored video signals for outputting the signals to the switch S1 in concert with the sequencing rate, on the basis of the synchronizing signal generated by the synchronizing generator 6B thereby, providing smooth switching from one television camera to another. The memory circuit or circuits of the time base corrector 7 will regenerate the fields or frames of the video signals fed by the transmitter 2 or 4B, synchronously on the basis of the sync signals and repeatedly with every sequencing cycle, and feed the synchronously regenerated video signals to the switch input terminals 13/1~13/n.

It should be noted that the parts of the television camera and the synchronizing signal generator and/or the time base corrector which are known have not been described in detail herein because they are disclosed in the referenced patents.

The well known identification code set is an individually allotted code to each of the transmitters 2, to identify the video signal generated by the corresponding transmitter 2. Identification code such as numbers, "1", "2", "3" . . . "n", can be used as camera identification code, respectively.

An apparatus for generating code signals and a circuit for injecting code signals into the video signal is disclosed in U.S. Pat. No. 4,943,864, the contents of which are incorporated herein by reference, therefore, each of the composite video signals received by the apparatus for converting coded serial video signal into serial IP signal 30 incorporates identification code.

The code signal is a binary code or a bar code signal having two or more levels, composed of a high level or white, which is the maximum level of the picture signal in the video signals, a low level or black, which is lowest level of the picture signal, and a median level or gray, which is the mid level of the picture signal in the video signal, generated by the television cameras 2A or 2B, the identification code may be a combination of pulse signal levels and varying pulse widths and/or pulse polarities.

Alternatively, the code signal may be either a sine-wave signal or a pulse signal having a frequency corresponding to the identification code, and the sine-wave or the pulse signal is generated during one or more horizontal scanning period, preferably during the vertical blanking period.

The code generating circuits 3, 3A shown in FIGS. 1, 2, 3 and 5 superposes the code signal into the video signal fed from the corresponding television camera 2A or 2B, and then outputs a signal composed of the code signal superposed in the video signal to the video transmission line 5 and to the input of the switch circuit 13/1~13/n.

The switch S1 of the frame switcher 11 feeds in sequence and in synchronized rotation the coded signals through the synchronizing pulse clipping circuit 19, on the basis of the external synchronizing signal generated by the external synchronizing signal generator 6, therefore, each of the coded serial video signals are fed in sequence and in rotation to the output terminal 18 for at least one vertical scanning period of the video signal.

The switch S1, as discussed above may be an electronic switching circuit using well known switching technic by employing readily available ICs or discrete circuit. The switching timing can be locked to a synchronizing signals separated from the received video signals by a well known sync separator 33 shown in FIG. 1 and FIG. 7, or by locking the switching timing to the field or the frame pulse generated by the external synchronizing generator 6.

Figure 4:
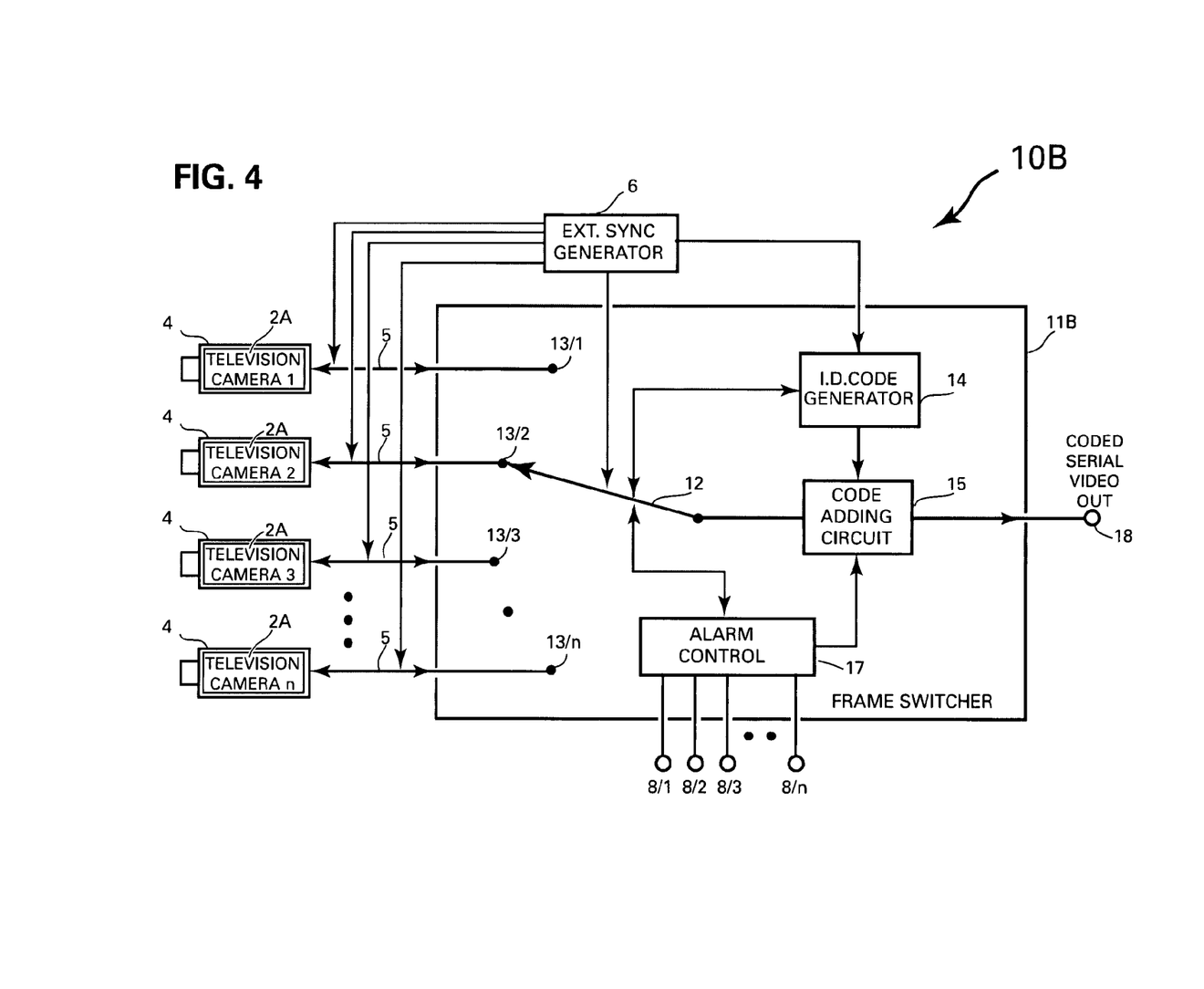
FIG. 4 is a block diagram showing electric circuit of yet another frame switcher with an identification code generating circuit.

The well known frame switchers or multiplexers 11B and 11D connected into a system setup 10B and 10C shown in FIGS. 4 and 6, to the transmitters 4 and 4B having no code generators, incorporate an identification code generator 14 and code adding circuit 15 which are essentially identical to the identification code generator 3 but including a code memory for storing a preprogrammed identification codes as programmed for each transmitter 4 and 4B, for generating individual codes in accordance to a data fed from the switch pole 12 for identifying the switch position. As will be explained, a code setting circuit, shown as alarm control 17, will also generate other data in addition to the individual code, in accordance with the pole 12 position, related to alarm, diagnostic, motion detection, camera coordinate and lens positioning, malfunction, site data and other relevant site information for feeding such other data in a preprogrammed codes or protocols through the code adding circuit 15 to the video signal, therefore, each individual sequencing signal will be added with other codes along with the individual identification code, allotted to the individual transmitter 4 or 4B connected to an input 13/1~13/n of the switch S1.

The well known code generators 3 and 3A shown in FIGS. 1, 2, 3, and 5 include alarm input terminal 8 for generating other data related to the transmitters 2 and 4. Such data can include a motion detection data generated by the cameras 2A or 2B, or it can be one or more alarm triggering data, or it can be a data pertaining the coordinate positioning of the camera, a failure or other diagnostic data from the camera or the transmitter, and any other data pertaining the camera, the transmitter, the site where the camera is installed and other relevant data. Such data is preprogrammed and inputted in a form of codes, also known as protocols, for superposing the data along with the assigned code into the video signal generated by the transmitters 2 and 4.

Similarly the alarm control 17 shown in FIGS. 4 and 6 can be fed with alarm and other data for each individual transmitter 4 and 4B through the respective alarm inputs 8/1, 8/2, 8/3 and 8/n for feeding the codes or the protocols relating to the current selected input to the code adding circuit 15, thereby feeding the coded serial video signal through output 18 with alarm and other coded data.

The details of the code generator and the code adding circuits are not fully explained here, because they are fully disclosed in the referenced patents. By all the above, it becomes clear that the well known plurality of transmitter, externally synchronized or not, connected to the well known frame switcher or multiplexer can include identification and other data or protocol in predefined codes, individually superposed into each individual coded signal of the coded serial video signal outputted through the output buffer circuit or terminal 18 of the frame switcher or multiplexer 11, 11A, 11B, 11C and 11D shown in FIGS. 2, 3, 4, 5 and 6.

Figure 7:
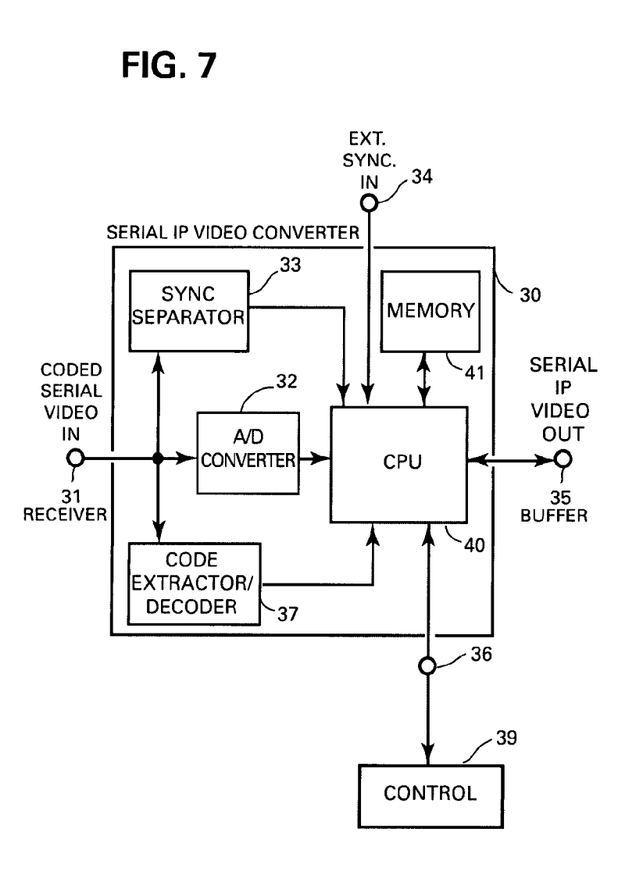
FIG. 7 is a block diagram showing electric circuit of the preferred embodiment of the serial IP video converter of the present invention.

The serial IP video converter 30 for converting coded serial video signal to serial IP video signal shown in FIGS. 1 and 7 includes sync separator 33 for separating the sync from the received coded serial video signal for detecting the timing of its serial sequence and/or an external sync input 34 for direct feeding of the sequence timing.

The sync separator 33 is a well known circuit used in all television receivers and is commonly available as a low cost single packaged IC. It is also used for separating the different synchronizing pulses of a television signal for feeding a time base for timing the horizontal and/or the vertical circuits of a television signal processors, such as the serial IP video converter 30. The sync separator 33 of FIGS. 1 and 7 is shown as a stand alone circuit of the serial IP video converter 30, but in practice it is combined into the analog to digital converter circuit 32.

The analog to digital converter 32 is also commonly available as a low cost single package IC device, which commonly includes a sync separation circuit for converting the received analog video signal into a digital video signal. The analog to digital converter 32 of the serial IP video converter 30, as explained above, includes the sync separator 33 for converting each individual analog signal into a packet of digital video signal and the serial video signal into a serial sequence of digital packets timed with the received coded serial video signal.

The serial IP video converter 30 further includes, as disclosed in the referenced patents, a well known code extractor/decoder 37 for extracting the code signals and decoding the codes assigned to each individual transmitter 2, 4 and 4B, or to the individual inputs of the multiplexer and the frame switcher 11, as well as extracting and decoding any of the alarm and other data or protocols superposed into each individual video signal of the coded serial video signal fed to the input receiver 31 and a CPU (Central Processing unit) 40 comprising a well known microprocessor circuit or a personal computer (PC), one or more memory storage devices, such as the well known flash memory or HDD (Hard Disk drive) 41 and a control (in-out) terminal 36 for connecting and feeding control commands for operating said CPU and said serial IP video converter 30.

The CPU is fed with the converted packets of digital serial video signal a long with the individually decoded codes, alarm and/or other data or protocols detected by the code extractor/decoder 37 and with the synchronizing pulses fed from the sync separator 33 or the directly fed pulses P1 from the ext. sync generator 6 for timing the operation of the CPU.

The CPU 40 comprises a well known compress circuit (not shown) and/or is installed with software package for compressing the digital serial video signal employing any one of the well known compression formats such as JPEG, MJPEG, WAVELET, MPEG, MPEG1, MPEG2, MPEG4, H263, H264, similar format or custom compression program and for feeding the compressed signals, and as explained later, combined with an IP source and destination addresses to the network 9 through the output buffer/connector 35.

The output buffer/connector 35 for feeding the IP serial video signal to the network 9 is a well known buffer/connector for feeding and receiving digital signals to and from a network, such as bus line, LAN (Local Area Network), WAN (Wide Area Network), the well known Ethernet network or the Internet.

The time of the feeding of an addressed based digital signal packet, such as serial IP video signal, similar to the feeding of any other IP packet with similar addressing cannot be precisely governed, particularly when the network is accessed by other communicating devices, and to prevent collision with other propagated data the buffer/connector 35 must check the network for a free time slot, during which no other signals are detected on the network, for enabling the feeding of the IP packet containing the IP video signal to the network only during such free time slot.

The random nature of data propagated over a network makes it difficult to ensure free time slots synchronized or timed with the sequencing video signals, which prevent the feeding of a continuous undisturbed IP serial video signal into the network.

A frame switcher or a multiplexer 11 can sequentially switch the generated video signal of n cameras, in the example of the NTSC system, at a rate of 60 fields or 30 frames per second and therefore feed the serial IP video converter 30 with up to 60 pictures on the basis of field per picture, or up to 30 pictures on the basis of frame per picture. A frame of a television system comprise two fields and therefore the picture information of a frame is about twice of the picture information of a field, which requires twice the time needed to generate field picture information. The time duration of a field of the NTSC or EIA system is 1/60 sec or 16.66 mSec (milli second) and the frame time is 33.33 mSec. In the PAL or CCIR system with 50 fields and 25 frames, the time duration of a field is 1/50 sec=20 mSec and the frame duration is 40 mSec.

Any number of cameras can be connected to a frame switcher or a multiplexer 11 with their signal sequenced in rotation. For example if ten cameras are connected to a frame switcher, each of the ten cameras will be sequenced 6 times per second for outputting a total of six fields per second, per camera. If 120 cameras are connected, each camera will be sequenced every two seconds for outputting a single field per camera every two seconds. Same will apply to a frame rate sequence, wherein three frames of each of the ten connected cameras will be outputted per second (3×33.3 mSec×10=1 sec). If 120 cameras are connected and sequenced at frame rate, one frame of each of the 120 cameras will be outputted once every 4 seconds.

The explanation above refers to a routine sequence, however, it is also possible to program and command the frame switcher or the multiplexer 11 to sequence the camera's signal not in a routine or numerically rotating sequence, but in a programmed or commanded sequence pattern such as 1-2-1-3-1-4-1-n or 1-1-1-2-3-4-n-n-n, providing that a sequence rate of 60 fields or 30 frames per second is generated for the NTSC system or 50 fields and 25 frames for PAL. Another pattern is a repeat generation and feeding of the same stored picture of a selected camera or of several cameras from a memory, such as the memory 7 shown in FIG. 6, thereby reducing the number of the sequencing cameras per second, but maintaining continued generation of 60 field or 30 frames for NTSC or 50 field and 25 frames for PAL, with some or all of the fields Or the frames are repetitiously fed with identical picture information.

The successful propagation of serial IP video signal through a network depends on the capacity and the speed of the network to process and distribute the serial IP video signal to its destinations. The capacity and the speed of commonly used Ethernet based LAN is 100 MB, while an IP packet of a digital video signal generated by a commonly used surveillance camera contains data of between 15 KB to 200 KB per picture of a field or frame on the average. The data varies depending on the content of the picture, and depending on the compression format and the volume of movements within and the size of the picture. For example MJPEG will compress the whole picture, MPEG2 will compress two ways, the base frame (I picture) of the whole picture and a series of frames (P picture) consisting of movements within the picture. The volume of data for the compressed whole picture is large, while the volume of the data for the compressed movement information is substantially smaller and therefore, IP packets containing compressed data of a picture (field or frame) may vary from one packet to next substantially in volume of data.

Therefore, even though the average data may be of 15 KB and up to 200 KB per picture as explained above, an IP packet of compressed data may contain at random data of over 1 MB or more. The data contained in an IP packet of non compressed digital video signal may have a volume of data ranging between 1 MB and 3 MB or more per field or frame and here too the volume is dependent upon picture details and the resolution.

Considering that the maximum bandwidth of a commonly used LAN is 100 MB, it is obvious that the introduction of serial IP video signal at a rate of 60 packets per sec, each may contain 1 MB or more of field data, will be practically impossible to feed into a network on a precise time slot, particularly when other communications are processed via the same network.

The memory 41 shown in FIG. 1 is also used as a buffer memory for receiving and storing temporarily any number of fields or frames of digital video signals, processed by the CPU 40, and for releasing the stored signal back to the CPU 40 upon command. Such command to release one field or frame of a digital video signal, compressed or non compressed, is generated by the CPU to the memory 41 on the basis of the sync fed from the ext. sync generator 6 or from the sync separator 33 and on the basis of availability of a time slot as sensed by the network buffer/connector 35 and on the calculated basis of the data volume of the stored signal and the serial timing requirement for the serial IP video signal. With proper algorithm, estimation and calculation of the data volume, number of cameras, transmission rate and destinations it is possible to provide a software program to timely generate serial IP video signal into a given network, such as network 9.

Because the time duration for one field or frame of the coded serial video signal is measured in milli seconds units, such as 16.6 mSec, 20 mSEc, 33.3 mSec and 40 mSec, any high speed CPU 40 such as the well known Pentium PC can process and compress any picture information of a field or frame at a shorter time than the above mentioned time duration of milli seconds. In fact the processing, compressing and feeding the processed digital information signal to the network 9 or to the memory 41 can be completed in micro seconds time units, therefore there should be no delay in the processing of the coded serial video signal by the CPU. Similarly the code extractor/decoder 37, the sync separator 33 and the A/D converter 32 will output with insignificant delay their respective signals to the CPU, by this it is clear that the IP serial video converter 30 can process the coded serial video signal and compress repeatedly and synchronously timed every field or frame with insignificant time delay. The feeding of the processed signal to the network 9 from the CPU 40 however, may involve time delays, depending on the network activity.

The well known Network Buffer/connector 35, which is commonly found in PC using well known single IC chip, is controlled by the CPU 40. The network buffer/connector 35 includes a network sensor for sensing the presence of a signal on the network, and for commanding the CPU 40 to propagate the processed signal into the network 9 via the Buffer/connector 35 when no other signal is detected on the network. By such arrangement the CPU can feed the processed signal in real time to the network 9 via the Buffer/connector 35 if no signal is detected on the network, or feed the processed signal to the memory 41 for temporary storage if the network 9 is occupied by other communication signals, and retrieve the stored signal for propagation into the network when the network is no longer occupied, i.e., when a free time slot becomes available.

The time units for sensing the network are commonly measured in nano second units and so are the internal communications and commands between the CPU 40, the memory 41 and the network buffer/connector 35, enabling for high speed response to network availability.

Further, if the network 9 is dedicated only to the propagation and recording of the coded serial video signal, there is no need for the buffer/connector 35 to look for free time slot on the network and the CPU can feed the processed serial video signal repeatedly and synchronously with the fed coded serial video signal, except when the data of each picture or of several pictures is larger than the network capacity to handle, for example when the data contained in one or several packets of the serial IP video signal is larger than 2 MB per packet, at which time the CPU 40 uses the memory 41 for temporary storage and retrieving and for feeding the data to the network after completing the feeding of the current fed packet. In such a case the feeding of the processed signal to the network will not be perfectly timed with the sync of the coded serial video.

The propagating of the serial IP video signal at a synchronous timing intervals in not necessary and will not affect the recording and the playback of such recorded pictures. It will not be even noticeable at all when a PC connected to the network 9 is used for monitoring the propagated pictures generated by the coded serial video from the frame switcher. Since each individual picture does not represent real time moving pictures, only a sequence of individual picture from different cameras, the precise timing between the propagated individual pictures, with delays measured in fraction of a second or even a whole second delay into a network become unimportant.

As explained above, for propagating a packet of data containing digital video signal of a frame or field of a television picture through a network, the packet must incorporate a well known address, known as IP address. The IP (Internet Protocol) address standard currently consists of four groups of 8 bit numbers, which is a unique or exclusive assigned address for each PC or any other communication signal receiver and/or transmitter connected to the network.

The well known IP addresses are incorporated in the packet header for identifying the destination to where or to which PC or digital recorder the packet is destined and the source address, identifying from where, or from which PC or IP camera the signal is originated. The destination address (as well as gateway and other routing addresses) is also used by the network to rout and connect a recorder such as the recorders 50/1 and 50/n through a network router (not shown), or switchover and connect the recorders 50/1 and 50/n or a PC through a switching hub (not shown) to the IP serial video converter 30 through the network buffer/connector 35.

In the future the IP address standard will be expanded from its current standard known as IPv4 for its four groups of 8 bit numbers to IPv6 that contains six groups of 8 bit numbers for providing many more unique addresses to a variety of appliances and the like. Further a group of assigned IP addresses of the current and the future standard are reserved as multicast addresses, also known as broadcast addresses, for feeding several PCs with a given communication packet or serial of packets containing serial IP video signal for simultaneous display or recording into several PCs or several RAID or other recording devices.

It is also possible to assign one common source IP address to all the individual digital signal of the serial video and combine sub address or a specific code to each individual digital signal into its packet for recording all the serial video signals into the recorder, such as RAID, using a common source IP address, but logging and retrieving the individual recorded signals on the basis of such sub address or the specific code referred to above.

By such arrangements it becomes clear that the CPU 40 of the serial IP video converter 30 can be preprogrammed to generate assigned IP addresses including source, destination and/or other routing and sub addresses, be it in IPv4, IPv6 or any other current of future standard, and introduce such individually assigned addresses to the packet header, as programmed for each packet, on the basis of a conversion list or a conversion file, also known as a conversion table or as a lookup table, for converting the decoded codes of the coded serial video signal, also known as ID CODE, into IP addresses.

Figure 8:
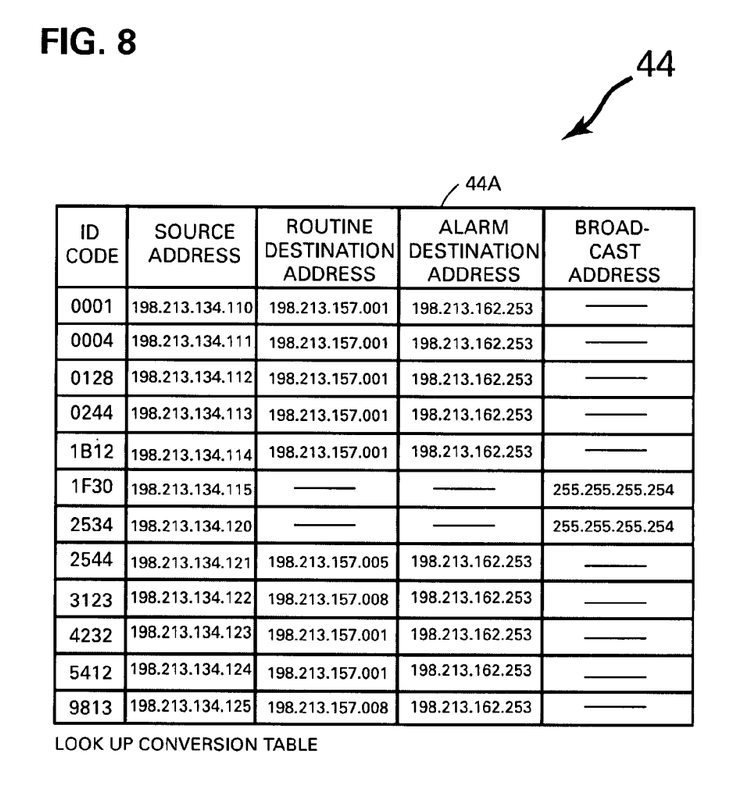
FIG. 8 is a lookup table for the conversion of ID codes into IP sources and destination addresses.

Shown in FIG. 8 is a lookup conversion table, or a conversion list, or a conversion file 44 for programming the conversion of the ID CODE assigned to and generated by each individual camera and fed by, or assigned to each input of a frame switcher or a multiplexer, into an assigned IP address and for assigning destination address to each individual ID CODE or to any number of ID CODEs, including broadcast addresses as explained above. The conversion program shown in the table, list or file 44 is created by the control 39, and as explained below, is memorized by the memory 41 for communicating its conversion data and applications with the CPU 40. As shown in the table 44 the column alarm destination address 44A provides for directing the packets containing alarm triggered and other data to another destination address, for recording the alarm and other data into a recorder that is dedicated, for example, to record exclusively the alarms and/or the other data. The conversion program of the table or list 44 shows limited columns for conversions and applications, it can however cover many other IP and routing addresses or sub addresses, as explained above, for each individual ID CODE, or the details of how to decode, encode or process protocols and applications or the processing of other data or the alarms, using different menus, columns, tables, lists, or sub tables, or sub menus as needed.

The conversion table or file 44 shown in FIG. 8 can be programmed via the control 39, the control 39 can be a commonly available keyboard used for a PC, or it can be a set of front panel keys of the serial IP video converter 30, or it can be an IR or wireless remote control device, or it can be set of programmed commands installed into a separate PC and loaded into the serial IP video converter 30 remotely.

The controller 39 can also control the frame switcher or the multiplexer 11 through a command line such as bus line, RS232, RS422, USB or any other serial, parallel or wireless command used by the frame switcher or the multiplexer 11 for remote controlling of its operation.

The commands from the controller 39 to the frame switcher or the multiplexer 11 can include commands such as by-pass of any of the connected cameras from, or re-entering by-passed cameras into the sequence, select anyone or more of the coded signals to repeat their field or frame generation, change the routine sequence into a selected programmed sequence pattern, change the sequence from field to frame rate or from frame to field rate, and any other setting and selection as needed for the smooth processing of the coded serial video signal that are fed by the frame switcher or the multiplexer 11 to the serial IP video converter 30. The commands from the control 39 to the frame switcher 11 and/or to the serial IP video converter 30 can be manually executed or they can be an automated generation of pre-designed and calculated programmed commands to coordinate the smooth processing of the coded serial video signal, the timely feeding of the coded serial video signal and in concert with the feeding of the processed serial IP video signal into the network 9.

By the use of the serial IP video converter 30 it becomes clear that it is possible to convert coded serial video signal into serial IP video signal for feeding IP packets containing digital video signal and IP addresses into a network for propagating the serial IP video signal to the network recorders 50/1~50/n or to other recorders or PCs in a simple process.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for converting serial video comprising a series of coded individual video signals into a serial IP video signal using at least one of programs and circuits including a receiver, an analog to digital converter, a decoder of a code in each of said individual video signals, one of a sync separator and an external sync input, a memory and a CPU, said method comprises the steps of:

receiving said serial video via said receiver and detecting via said one of a sync separator and external sync the time base of said serial video for providing said time base to said converting; converting said serial video via said converter to a serial sequence of packets representing each of said individual video signals converted to individual digital video signal in said sequence;

extracting and decoding the code of each of said individual video signals;

applying a conversion program of said programs for assigning IP addresses including at least a source address and a destination address stored in said memory for each decoded code;

generating IP packets via said CPU by adding to each of said packets its assigned IP addresses; and feeding said IP packets to a network one after another in said sequence.

2. The method as set forth in claim 1 and further comprising the steps of;

Compressing at least one of said converted individual digital video signal.

3. The method as set forth in claim 1 and further comprising the steps of;

receiving other coded data from at least one said individual video signal, including other data selected from a group comprising time and date of a triggered alarm signal, said alarm data, a motion detection data, a camera diagnostic data, said camera coordinate positions data, said camera malfunction data, said camera site data and combinations thereof; and decoding said other coded data for adding said other data into the IP packet of said at least one said individual digital video signal.

4. The method as set forth in claim 1 and further comprising the steps of;

assigning in said conversion program a common source address and an individual sub address for each of at least two of said decoded code;

adding said individual sub address to each of said IP packets associated with said common source address.

5. The method as set forth in claim 1 and further comprising the steps of;

assigning in said conversion program at least two destination addresses for dividing said feeding of said IP packets to at least two separate destinations via said network.

6. The method as set forth in claim 1 and further comprising the steps of;

assigning in said conversion program a broadcast destination address for feeding at least one of said IP packets to multiple destinations via said network.

7. The method as set forth in claim 3 and further comprising the steps of;

assigning in said conversion program at least one specific destination address for feeding any of said IP packets incorporating said other data to said specific destination via said network.

8. A method for converting serial video comprising a series of coded individual video signals fed by one of a multiplexer and a frame switcher into a serial IP video signal using at least one of programs and circuits including a receiver, an analog to digital converter, a decoder of a code in each of said individual video signals, one of a sync separator and an external sync input, a memory and a CPU, said method comprises the steps of:

receiving said serial video via said receiver and detecting via said one of a sync separator and external sync the time base of said serial video for providing said time base to said converting; converting said serial video via said converter to a serial sequence of packets representing each of said individual video signals converted to individual digital video signal in said sequence;

extracting and decoding said code of each of said individual video signals;

applying a conversion program of said programs for assigning IP addresses including at least a source address and a destination address stored in said memory for each decoded code;

generating IP packets via said CPU by adding to each of said packets its assigned IP addresses; and feeding said IP packets to a network one after another in said sequence.

9. The method as set forth in claim 8 and further comprising the steps of;

Compressing at least one of said converted individual digital video signal.

10. The method as set forth in claim 8 and further comprising the steps of;

receiving other coded data from at least one said individual video signal, including other data selected from a group comprising time and date of a triggered alarm signal, said alarm data, a motion detection data, a camera diagnostic data, said camera coordinate positions data, said camera malfunction data, said camera site data and combinations thereof; and decoding said other coded data for adding said other data into the IP packet of said at least one said individual video signal.

11. The method as set forth in claim 8 and further comprising the steps of;

assigning in said conversion program a common source address and an individual sub address for each of at least two of said decoded code;

adding said individual sub address to each of said IP packets associated with said common source address.

12. The method as set forth in claim 8 and further comprising the steps of;

assigning in said conversion program at least two destination addresses for dividing said feeding of said IP packets to at least two separate destinations via said network.

13. The method as set forth in claim 8 and further comprising the steps of;

assigning in said conversion program a broadcast destination address for feeding at least one of said IP packets to multiple destinations via said network.

14. The method as set forth in claim 10 and further comprising the steps of;

assigning in said conversion program at least one specific destination address for feeding any of said IP packets incorporating said other data to said specific destination via said network.

15. A method for converting coded serial video comprising a series of coded individual video signals propagated in a system comprising plurality of video transmitters, one of a multiplexer and a frame switcher, at least one network recorder and a serial IP video converter including one of programs and circuits comprising a receiver, an analog to digital converter, a decoder of a code in each of said individual video signals, one of a sync separator and an external sync input, a memory and a CPU, into a serial IP video signal, wherein each of said plurality of video transmitters generates and feeds its video signal to said one of a multiplexer and a frame switcher for feeding said serial video to said serial IP video converter, said method comprises the steps of:

receiving said serial video via said receiver and detecting via said one of a sync separator and external sync the time base of said serial video for providing said time base to said converting;

converting said serial video via said analog to digital converter to a serial sequence of packets representing each of said individual video signals converted to individual digital video signal in said sequence;

extracting and decoding said code of each of said individual video signals;

applying a conversion program of said programs for assigning IP addresses including at least a source address and a destination address stored in said memory for each decoded code;

generating IP packets via said CPU by adding to each of said packets its assigned IP addresses; and feeding said IP packets to a network one after another in said sequence.

16. The method as set forth in claim 15, wherein said code signal is individually included in the video signal generated by each of said transmitters or is introduced to said serial video on the basis of an assigned input number of said one of multiplexer and said frame switcher to which each of said transmitters is connected to.

17. The method as set forth in claim 15 and further comprising the steps of;

Compressing at least one of said converted individual digital video signal.

18. The method as set forth in claim 15 and further comprising the steps of; receiving other coded data related to said transmitters from at least one said individual video signal, including other data selected from a group comprising time and date of a triggered alarm signal, said alarm data, a motion detection data, a camera diagnostic data, said camera coordinate positions data, said camera malfunction data, said camera site data and combinations thereof; and decoding said other coded data for adding said other data into the IP packet of said at least one said individual digital video signal.

19. The method as set forth in claim 15 and further comprising the steps of;

assigning in said conversion program a common source address and an individual sub address for each of at least two of said decoded code;

adding said individual sub address to each of said IP packets associated with said common source address.

20. The method as set forth in claim 15 and further comprising the steps of;

assigning in said conversion program at least two destination addresses for dividing said feeding of said IP packets to at least two separate destinations via said network.

21. The method as set forth in claim 15 and further comprising the steps of;

assigning in said conversion program abroad cast destination address for feeding at least one of said IP packets to multiple destinations via said network.

22. The method as set forth in claim 18 and further comprising the steps of;

assigning in said conversion program at least one specific destination address for feeding any of said IP packets incorporating said other data to said specific destination via said network.

23. The method asset for thin claim 22, wherein said specific destination is an assigned network recorder included in said system for receiving and storing said serial IP video signal incorporating said other data.

24. A serial IP video converter for converting serial video comprising a series of coded individual video signals to a serial IP video signal, comprising:
   a receiver for receiving said serial video including an analog to digital converter for converting the individual video signals into packets of digital video signals, a decoder for decoding the code of each of said individual video signals, one of a sync separator and an external sync input for providing a time base to the processing by said serial IP video converter, a memory for storing a conversion program including an application of at least a source and a destination IP addresses assigned to each of the decoded codes, and a CPU for forming an IP packet by combining each said packet with its assigned IP addresses and for generating and feeding a serial sequence of individual IP packets into a network via a network buffer.

25. The serial IP video converter according to claim 24, wherein said CPU compresses at least one of said packet of digital video signal.

26. The serial IP video converter according to claim 24, wherein said CPU retrieves the stored data of said conversion program from said memory.

27. The serial IP video converter according to claim 24, wherein said memory temporary stores for retrieving at least one of said packet and said IP packets to overcome time delays during said feeding of said IP packets into said network.

28. The serial IP video converter according to claim 24 further comprising a controller for controlling said CPU and for programming said conversion.

29. The serial IP video converter according to claim 24, wherein said decoder and said CPU are programmed to decode and process other coded data related to at least one said individual video signal, said other coded data including other data selected from a group comprising time and date of a triggered alarm signal, said alarm data, a motion detection data, a camera diagnostic data, said camera coordinate positions data, said camera malfunction data, said camera site data and combinations thereof, for adding said other data into said IP packet of said at least one said individual video signal.

30. The serial IP video converter according to claim 24, wherein said conversion program includes a common source address and an individual sub address for each of at least two of said decoded identification codes for adding said individual sub address to each of said IP packets associated with said common source address.

31. The serial IP video converter according to claim 24, wherein said conversion program includes at least two destination addresses for dividing said feeding of said IP packets to at least two separate destinations via said network.

32. The serial IP video converter according to claim 24, wherein said conversion program includes a broadcast destination address for feeding at least one of said IP packets to multiple destinations via said network.

33. The serial IP video converter according to claim 29, wherein said conversion program includes at least one specific destination address for feeding any of said IP packets incorporating said other data to said specific destination via said network.

34. A serial IP video converter system for converting serial video comprising a series of coded individual video signals to a serial IP video signal, comprising:
   plurality of video transmitters connected to one of a multiplexer and a frame switcher for outputting said serial video, said serial IP video converter comprising:
   a receiver for receiving said serial video including an analog to digital converter for converting the individual video signals into packets of digital video signals, a decoder for decoding the code of each of said individual video signals, one of a sync separator and an external sync input for providing a time base to the processing by said serial IP video converter, a memory for storing a conversion program including an application of at least a source and a destination IP addresses assigned to each of the decoded codes, and a CPU for forming an IP packet by combining each said packet with its assigned IP addresses and for generating and feeding a serial sequence of individual IP packets into a network via a network buffer.

35. The serial IP video converter system according to claim 34, wherein said code is individually included in the video signal generated by each of said transmitters or is introduced to said serial video on the basis of an assigned input number of said one of multiplexer and a frame switcher to which each of said transmitters is connected to.

36. The serial IP video converter system according to claim 34, wherein said CPU compresses at least one of said packet of digital video signal.

37. The serial IP video converter system according to claim 34, wherein said CPU retrieves the stored data of said conversion program from said memory.

38. The serial IP video converter system according to claim 34, wherein said memory temporary stores for retrieving at least one of said packet and said IP packets to overcome time delays during said feeding of said IP packets into said network.

39. The serial IP video converter system according to claim 34 further comprising a controller for controlling said CPU and for programming said conversion.

40. The serial IP video converter system according to claim 39, wherein said controller is adapted to control said CPU and said one of a multiplexer and a frame switcher for coordinating said sequence with said individually coded video signals of said serial video.

41. The serial IP video converter system according to claim 34, wherein said decoder and said CPU are programmed to decode and process other coded data related to said transmitters and included in at least one said individual video signal, said other coded data including other data selected from a group comprising time and date of a triggered alarm signal, said alarm data, a motion detection data, a camera diagnostic data, said camera coordinate positions data, said camera malfunction data, said camera site data and combinations thereof, for adding said other data into said IP packet of said at least one said individual video signal.

42. The serial IP video converter system according to claim 34, wherein said conversion program includes a common source address and an individual sub address for each of at least two of said decoded codes for adding said individual sub address to each of said IP packets associated with said common source address.

43. The serial IP video converter system according to claim 34, wherein said conversion program includes at least two destination addresses for dividing said feeding of said IP packets to at least two separate destinations via said network.

44. The serial IP video converter system according to claim 34, wherein said conversion program includes a broadcast destination address for feeding at least one of said IP packets to multiple destinations via said network.

45. The serial IP video converter system according to claim 41, wherein said conversion program includes at least one specific destination address for feeding any of said IP packets incorporating said other data to said specific destination via said network.

46. The serial IP video converter system according to claim 45, wherein said system further includes more than one network recorder and said specific destination is a network recorder assigned for receiving and storing said serial IP video signal incorporating said other data.

47. A system for converting serial video comprising a series of coded individual video signals and feeding a converted serial IP video signal through a network to at least one network recorder, comprising:
a plurality of video transmitters connected through one of a multiplexer and a frame switcher to a serial IP video converter, said IP video converter comprising:
a receiver for receiving said serial video including an analog to digital converter for converting the individual video signals into packets of digital video signals, a decoder for decoding the code of said each individual video signal, one of a sync separator and an external sync input for providing a time base to the processing by said serial IP video converter, a memory for storing a conversion program including an application of at least a source and a destination IP addresses assigned to each of the decoded codes, and a CPU for forming an IP packet by combining each said packet with its assigned IP addresses and for generating and feeding a serial sequence of individual IP packets into a network via a network buffer to said at least one network recorder.

48. The system for converting serial video according to claim 47, wherein said code is individually included in the video signal generated by each of said transmitters or is introduced to said serial video on the basis of an assigned input number of said one of multiplexer and said frame switcher to which each of said transmitters is connected to.

49. The system for converting serial video according to claim 47, wherein said CPU compresses at least one of said packet of digital video signal.

50. The system for converting serial video according to claim 47, wherein said CPU retrieves the stored data of said conversion program from said memory.

51. The system for converting serial video according to claim 47, wherein said memory temporary stores for retrieving at least one of said packet and said IP packets to overcome time delays during said feeding of said IP packets into said network.

52. The system for converting serial video according to claim 47 further comprising a controller for controlling said CPU and for programming said conversion.

53. The system for converting serial video according to claim 52, wherein said controller is adapted to control said CPU and said one of a multiplexer and a frame switcher for coordinating said sequence with said individually coded video signals of said serial video.

54. The system for converting serial video according to claim 47, wherein said decoder and said CPU a reprogrammed to decode and process other coded data related to said transmitters and included in at least one said individual video signal, said other coded data including other data selected from a group comprising time and date of a triggered alarm signal, said alarm data, a motion detection data, a camera diagnostic data, said camera coordinate positions data, said camera malfunction data, said camera site data and combinations thereof, for adding said other data into said IP packet of said at least one said individual video signal.

55. The system for converting serial video according to claim 47, wherein said conversion program includes a common source address and an individual sub address for each of at least two of said decoded codes for adding said individual sub address to each of said IP packets associated with said common source address.

56. The system for converting serial video according to claim 47, wherein said conversion program includes at least two destination addresses for dividing said feeding of said IP packets to at least two separate destinations via said network.

57. The system for converting serial video according to claim 47, wherein said conversion program includes a broadcast destination address for feeding at least one of said IP packets to multiple destinations via said network.

58. The system for converting serial video according to claim 54, wherein said conversion program includes at least one specific destination address for feeding any of said IP packets incorporating said other data to said specific destination via said network.

59. The system for converting serial video according to claim 58, wherein said specific destination is an assigned network recorder included in said system for receiving and storing said serial IP video signal incorporating said other data.

* * * * *